INVENTORS B. H. HAMILTON
H. WILHART
BY
John P. McDonnell
ATTORNEY

United States Patent Office 3,495,156
Patented Feb. 10, 1970

---

3,495,156
PUSH-PULL INVERTER WITH SYNCHRONIZED MONOSTABLE DRIVERS
Billy H. Hamilton, Summit, and Helmut Wilhart, Morristown, N.J., assignors to Bell Telephone Laboratories, Incorporated, Murray Hill and Berkeley Heights, N.J., a corporation of New York
Filed Mar. 29, 1968, Ser. No. 717,149
Int. Cl. H02m 1/18
U.S. Cl. 321—11                6 Claims

ABSTRACT OF THE DISCLOSURE

In a low-frequency inverter with push-pull output, a monostable multivibrator in the DC drive train of each separately driven leg protects the output transistors by turning them both OFF in the absence of a periodic drive signal. Multivibrators whose ON period decreases as the supply voltages decrease further protect the transistors by greatly reducing the duty cycle when the supply voltage is so low that the transistors fail to saturate.

BACKGROUND OF THE INVENTION

This invention relates to AC power sources, particularly to very low-frequency electronic generators.

In order to supply power at very low frequency such as the 20-cycle power used in telephone ringing systems, considerable space and weight is normally required. Even though transistors of small size can supply surprisingly large power outputs, the coupling capacitors, transformers and inductors which must be used with the transistors at this frequency are bulky and heavy. Traditionally, ferro-resonant transformers are used in the push-pull output stage of such generators to effect some weight and space saving, but they must be driven at a very accurate frequency. This normally entails several stages in the driving train, and therefore considerable weight and space devoted to coupling between stages. One way to eliminate such coupling is to drive each half of the push-pull output stage through a separate, direct-coupled, DC amplifier. This has not heretofore been a satisfactory solution, however, because if the driving signal is at any time interrupted, one output transistor remains conducting full time. The output transformer thereupon becomes saturated and ceases to limit the current through the transistor; the transistor overheats and is destroyed.

An object of this invention is, therefore, to provide a low-cost, self-protecting, very low-frequency power converter.

Another object is to provide self-protection against signal failure in a DC-driven, telephone-ringing generator.

A third object is to provide overheating protection of the output transistors of a telephone-ringing generator in the event of low battery voltage.

SUMMARY

In a power inverter, each half of the push-pull output transformer is driven by a separate DC amplifier. Each amplifier is in turn driven by a separate monostable circuit having an astable state of predetermined duration in response to an input signal. A source of digital driving signals having a half period less than the astable state duration is connected to both monostable circuits to drive the monostable circuits, DC amplifiers and output transformer in push-pull alternation. In the absence of driving signals for a time interval greater than the astable state duration, the monostable circuits return to their stable states to turn OFF the DS amplifiers and protect the output transistors. The astable state duration can be made dependent upon supply voltage to reduce the duty cycle of the output transistors when the supply voltage drops too low for the transistors to normally saturate.

A NOR gate construction of the monostable circuits allows rapid interruption and reinstatement of inverter output by low-level logic signals for telephone-ringing generator use.

DETAILED DESCRIPTION

Figure 1:
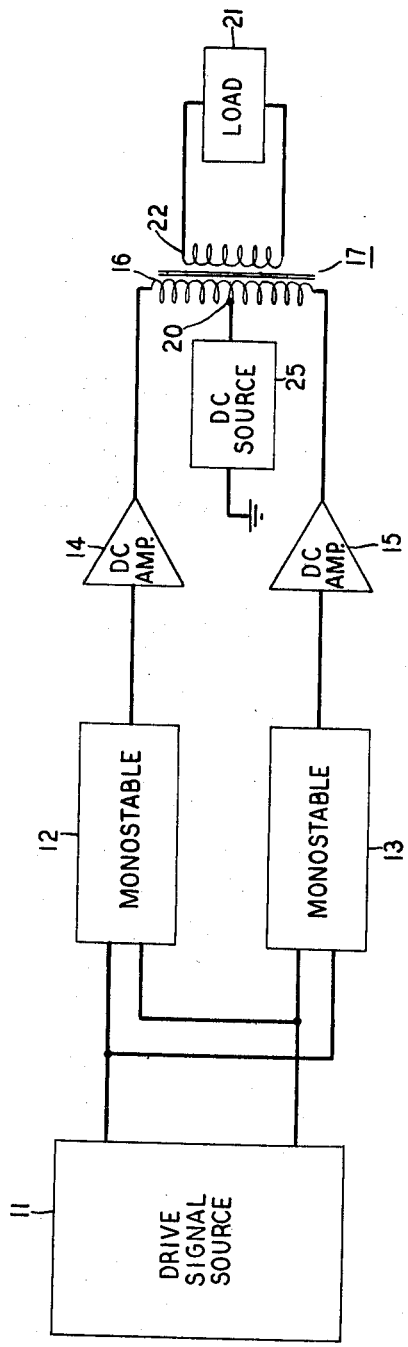
FIG. 1 is a block diagram of a simple embodiment of the invention.

In the embodiment shown in block form in FIG. 1, a source of driving signals 11 is connected to both inputs of each of a pair of monostable circuits 12 and 13. The outputs of monostable circuits 12 and 13 are connected to separate DC amplifiers 14 and 15, respectively. The outputs of amplifiers 14 and 15 are connected in turn to the primary winding 16 of an output transformer 17 in push-pull fashion. Center-tap 20 of winding 16 is connected to a DC source 25. A load 21 is connected to a secondary winding 22 of output transformer 17.

Each monostable circuit 12 and 13 is driven in response to a signal from source 11 into an astable or ON state. While each monostable circuit is in its astable state, its respective DC amplifier is conducting and providing current through its respective half of output transformer primary winding 16. When each monostable circuit is in its stable or OFF state, its related DC amplifier and transformer winding half is not conducting. In the absence of periodic input signals from source 11, the astable state of each monostable circuit is inherently self-terminating after a predetermined time. As a consequence, if for any reason signals from source 11 fail, each monostable circuit returns to its stable state, shutting off both DC amplifiers and protecting the output circuit. Furthermore, input signals may be intentionally turned OFF to conserve power when output is not needed.

The circuit will operate to provide power to the load with a wide range of wave shapes of the recurring signals from source 11. For maximum efficiency, however, each DC amplifier must be conducting for one-half cycle, but both must not conduct simultaneously. To accomplish this, the signals from source 11 are connected to drive the monostable circuits both into and out of their respective astable states in opposite phase synchronism. That is, one monostable circuit is driven ON as the other is driven OFF, and neither is normally allowed to time out and turn itself OFF. Consequently, steep-rising wave fronts are more satisfactory for the driving signal and a common square wave from driving signal source 11 has been found to operate very well.

Figure 2:
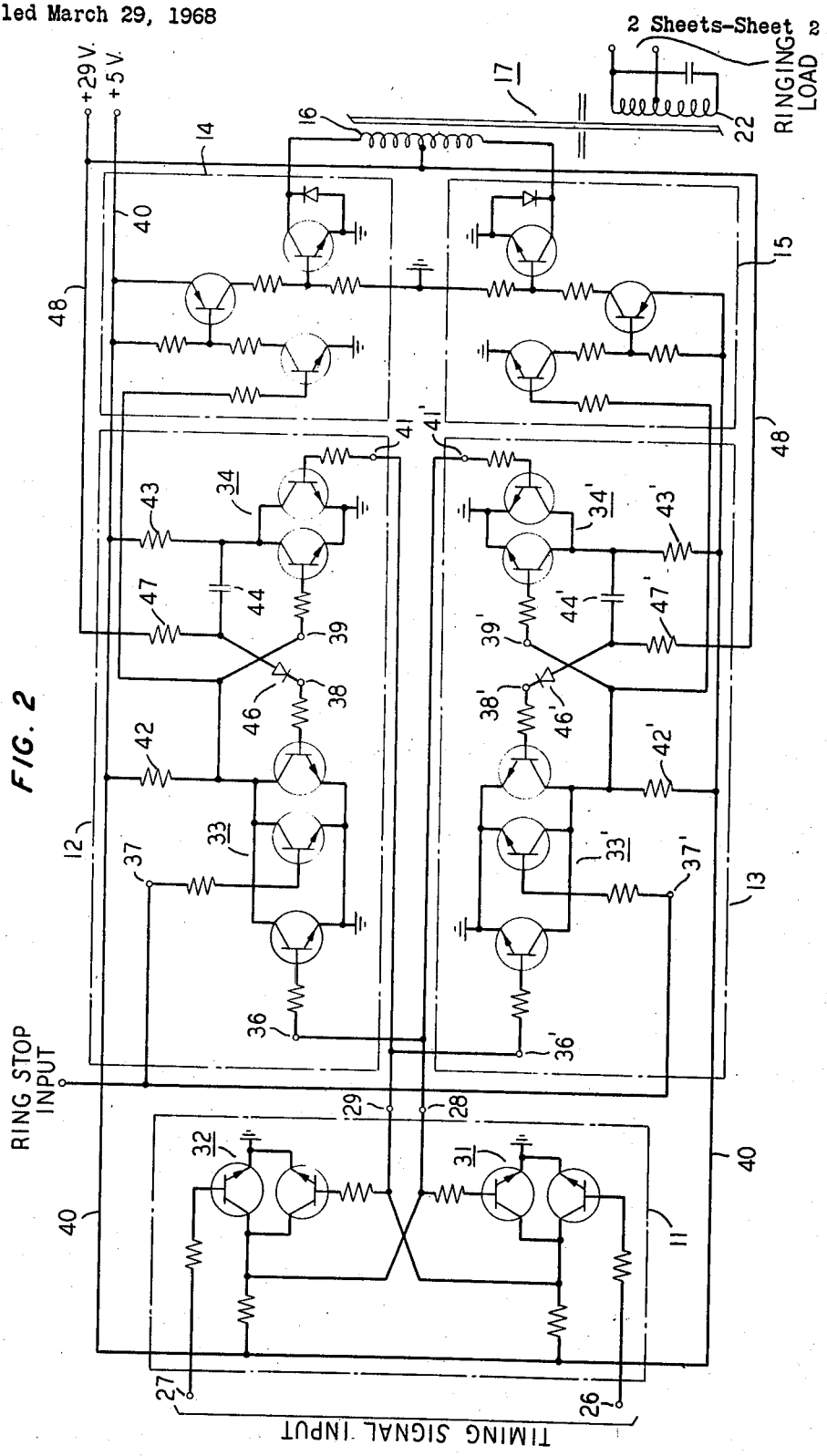
FIG. 2 is a schematic diagram of a preferred embodiment useful as a telephone-ringing generator.

The schematic diagram of FIG. 2 shows, in detail, an embodiment that is particularly useful as a telephone-ringing current generator. As in the embodiment of FIG. 1, a source of driving signals 11 is connected to both inputs of each of a pair of monostable circuits 12 and 13. The outputs of monostable circuits 12 and 13 are connected to the inputs of separate DC amplifiers 14 and 15 respectively, and the outputs of amplifiers 14 and 15 are connected to the primary winding 16 of an output transformer 17 in push-pull fashion.

In this case, driving source 11 comprises a bistable multivibrator driven by a symmetrical timing signal applied between inputs 26 and 27. Any of the well-known bistable multivibrators may be used satisfactorily in this position to provide a square wave of opposite phase at each of the two outputs 28 and 29. A particularly useful multivibrator comprises a pair of cross-connected NOR gates 31 and 32, rather than the more usual single transistors, in the manner shown by U.S. Patent No. 3,210,559, which issued to C. D. Gabriel on Oct. 5, 1965. This provides the advantage that inputs 26 and 27 are isolated from outputs 28 and 29. As will be discussed later, with integrated circuit construction the additional circuit cost is very small.

Since monostable circuits 12 and 13 may be identical one-shot multivibrators, only the former will be described in detail, and corresponding points in the latter will bear the same numbers primed. One-shot multivibrator 12 comprises a normally conducting NOR gate 33 and a normally non-conducting NOR gate 34. NOR gate 33, comprising three transistors, has a conduction path consisting of the three emitter-collector paths in parallel, and three inputs 36, 37 and 38—one connected to each transistor base through a current limiting resistor. Similarly, NOR gate 34, comprising two transistors, has a conduction path consisting of the two emitter-collector paths in parallel, and two inputs 39 and 41—one connected to each base. The conduction path of NOR gate 33 is connected to a five-volt supply bus 40 through a load resistor 42, and the conduction path of NOR gate 34 is connected to supply bus 40 through a load resistor 43. In typical one-shot multivibrator fashion, the collectors of gate 33 are connected to gate 34 input 39; the collectors of gate 34 are connected through a timing capacitor 44 and a diode 46 to gate 33 input 38. The diode is useful to limit the negative voltage that appears on input 38, particularly when integrated circuit transistors are employed in which the reverse base-emitter breakdown voltage is in the order of five to six volts. Additional amplifier overload protection may be provided as explained later, by connecting the junction of capacitor 44 and diode 46 through a resistor 47 to a 29-volt supply bus 48.

Whenever a positive voltage appears at any of the three inputs 36, 37 or 38, NOR gate 33 conducts. Similarly, a positive voltage at inputs 39 or 41 causes gate 34 to conduct. In the absence of any input signals, input 38 has a positive voltage applied from bus 48 through resistor 47 and diode 46, and hence gate 33 is normally conducting. While gate 33 is conducting, the voltage applied to input 39 from collectors of gate 33 is too low to drive gate 34 into conduction and capacitor 44 charges up with a positive five volts on the end connected to gate 34. The other end of capacitor 44 charges to a voltage less than five volts determined by resistor 47. When a positive voltage is applied to input 41 from output 29 of driving source 11, however, gate 34 conducts, rapidly turning OFF gate 33 via input 38 in typical multivibrator fashion until capacitor 44 discharges. The discharge time of capacitor 44 is set to be slightly longer than one-half period of the timing signal so that monostable circuits 12 and 13 are normally driven both ON and OFF in opposite phase synchronism. When output 29 is positive, gates 34 and 33' conduct; when output 28 is positive, gates 33 and 34' conduct.

The outputs of monostable circuits 12 and 13 are taken from the collectors of normally conducting gates 33 and 33' respectively, so that the outputs are positive during the astable period when each respective normally nonconducting gate, 34 and 34', is conducting.

Input 37 to NOR gate 33 provides a facility that is particularly useful in a remote telephone-ringing generator that services several customers. A small positive voltage applied to input 37 immediately turns OFF both monostable circuits and DC amplifiers to disable ringing. Removal of the voltage immediately returns the ringing generator to operation. As a consequence of the high speed with which this can be accomplished, a single ring-trip relay can serve several customers in place of the more usual ring-trip relay individual to each customer. When several telephones are being rung simultaneously from the one generator, any one telephone that goes off-hook trips the ring-trip relay to stop the ringing and drop all of the switch-hook relays served by the ringing generator. Those switch-hook relays of telephones still on-hook are then picked up again and ringing is reapplied to the unanswered telephones—all within 50 to 100 milliseconds. The ringing interruption is so slight as to be almost imperceptible to the customers who have not yet answered the ringing, and many relays and filters are eliminated.

DC amplifiers 14 and 15 being also identical, the former will be described with corresponding prime numbers applied to the latter. Amplifier 14 is a straight-forward, direct-coupled, three-stage amplifier. The polarity of the transistors alternates with the stages, so that when monostable circuit 12 is in its stable OFF state, providing no output voltage, all three transistors of amplifier 14 are also OFF drawing no current. This not only protects the transistors when there is no drive, an object of the invention, but provides very low current drain when there is no cause for ringing. The input timing signals may therefore be turned OFF as a means of conserving battery power when no ringing is needed.

With the advent of integrated circuits, the incremental cost of transistors can be very low provided the characteristics of the transistors are similar. In the circuit of FIG. 2, all transistors are used as switches operating in only the saturated and cut-off modes. As a consequence, all transistors in the bistable and monostable multivibrators, 11, 12 and 13 and the input transistors to DC amplifiers 14 and 15 may be identical. Furthermore, all base resistors for these transistors may have one value, and all collector resistors another value. The present circuit has been designed, therefore, using resistor-transistor logic to take full advantage of integrated circuit techniques, and the advantages pointed out in using two and three input NOR gates are therefore very inexpensive to achieve.

If the frequency of the signal source is accurate and stable, a ferro-resonant transformer may be used as output transformer 17 to provide output regulation with supply voltage changes. In such an embodiment, the center tap of primary winding 16 is connected to a 29-volt supply bus 48 to provide adequate ringing power output. The remainder of the circuit, with the exception of the monostable multivibrators 12 and 13 is supplied with five-volt bus 40 to provide efficient operation.

The circuit of FIG. 2 provides additional protection to the output transistors through the use of two supply voltages to monostable multivibrators 12 and 13. In case of a power failure that requires telephone plants to operate on battery power supplies, the supply voltage tends to drop with time. When the low voltage supply drops so low that the output transistors can no longer be driven into saturation, and if the higher voltage supply has not dropped proportionately, the transistor dissipation during conduction will rise considerably tending to overheat the transistors. The particular circuit of multivibrators 12 and 13, however, provides a capacitor discharge time which varies with the two supply voltages according to the expression $$\ln\left(1+\frac{V_L}{V_H}\right)$$

wherein $V_L$ and $V_H$ are the voltages on the low and high voltage busses respectively. If the low voltage battery discharges at a more rapid rate than the high voltage battery, which is likely, the capacitor discharge time of monostable circuits 12 and 13 decreases. When the discharge time decreases below one-half period of the timing signal, the output transistors are turned OFF prematurely. As a consequence, when the low voltage supply drops so low that the output transistors are no longer driven into saturation, the duty cycle of each transistor has been reduced considerably and the heat generated is kept at a safe level.

It is to be understood that the above-described arrangements are illustrative of the applications of the principles of the invention. Numerous other arrangements may be devised by those skilled in the art without departing from the spirit and scope of the invention.

What is claimed is:

1. A self-protecting inverter comprising a transformer having primary and secondary windings, a load connected to said second winding, first and second monostable circuits having an astable state of a predetermined duration in response to an input signal, first and second DC amplifiers have their inputs respectively connected to the outputs of said first and second monostable circuits and their outputs respectively connected to individual halves of said primary winding, and a source of digital driving signals having a half period less than said predetermined duration connected to said monostable circuits to drive said monostable circuits, their respective DC amplifiers and said primary winding halves in push-pull alternation, the absence of driving signals for a time interval greater than said predetermined duration causing said DC amplifiers to be nonconducting.

2. A self-protecting inverter comprising a transformer having primary and secondary windings, a load connected to said secondary winding, first and second monostable circuits having an astable state of predetermined duration in response to an input signal, first and second DC amplifiers having their inputs respectively connected to the outputs of said first and second monostable circuits and their outputs respectively connected to individual halves of said primary winding, said first and second DC amplifiers each comprising a plurality of transistor stages, each stage having a transistor of opposite polarity to that of the previous stage, and a source of digital driving signals having a half period less than said predetermined duration connected to said monostable circuits to drive said monostable circuits, their respective DC amplifiers and said primary winding halves in push-pull alternation, the absence of driving signals for a time interval greater than said predetermined duration causing all transistors of said DC amplifiers to be nonconducting.

3. A self-protecting inverter comprising a transformer having primary and secondary windings, a load connected to said secondary winding, first and second monostable circuits having an astable state of predetermined duration in response to an input signal, said first and second monostable circuits each including a first normally conducting NOR gate having at least two inputs and an output, a second normally nonconducting NOR gate having at least two inputs and an output, conducting means connecting the output of said first NOR gate with one input of said second NOR gate and capacitive means connecting the output of said second NOR gate with one input of said first NOR gate, first and second DC amplifiers having their inputs respectively connected to the outputs of said first and second monostable circuits and their outputs respectively connected to individual halves of said primary winding, and a source of digital driving signals having a half period less than the said predetermined duration connected to the second input of said first and second NOR gates to drive said monostable circuits, their respective DC amplifiers and said primary winding halves in push-pull alternation, the absence of driving signals for a time interval greater than said predetermined duration causing said DC amplifiers to be nonconducting.

4. An inverter as in claim 3 wherein said first normally conducting NOR gate of said first and second monostable circuits has a third input, and a source of ring-stop signals is connected to each of said third inputs for instantaneously returning both monostable circuits to their respective stable states.

5. An inverter as in claim 3 having a first source of DC voltage connected to said monostable circuits and said DC amplifiers such that said predetermined astable duration decreases below said half period of said driving signal to substantially reduce the duty cycle of said DC amplifiers when said first DC source voltage drops appreciably.

6. An inverter as in claim 5 including a second source of DC voltage and means connecting one end of said timing capacitor to said first source of DC voltage and the other end to said second source of DC voltage.

References Cited

UNITED STATES PATENTS

| | | | |
|---|---|---|---|
| 3,094,673 | 6/1963 | Maupin | 330—15 |
| 3,219,906 | 11/1965 | Keller et al. | 321—45 XR |
| 3,341,765 | 9/1967 | Rogers et al. | 321—45 XR |
| 3,351,840 | 11/1967 | Yearley | 321—45 |
| 3,407,349 | 10/1968 | Lehrer | 321—45 |

JAMES D. TRAMMELL, Primary Examiner

W. M. SHOOP, JR., Assistant Examiner

U.S. Cl. X.R.

321—45